Figure 1:
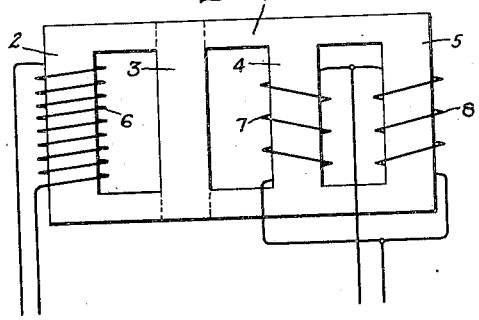

Aug. 8, 1933.        A. SCHMIDT, JR        1,921,703
VARIABLE REACTANCE DEVICE
Filed Nov. 13, 1931

Inventor:
August Schmidt, Jr.
by Charles E. Tullar
His Attorney.

Patented Aug. 8, 1933

1,921,703

UNITED STATES PATENT OFFICE 1,921,703

VARIABLE REACTANCE DEVICE

August Schmidt, Jr., Schenectady, N. Y., assignor to General Electric Company, a Corporation of New York Application November 13, 1931
Serial No. 574,843

6 Claims. (Cl. 171—242)

My invention relates to variable reactance devices and more particularly to improvements in saturable core reactors.

The saturable reactor is a well known regulating, or control device. It consists essentially of a pair of interlinked magnetic circuits on which are wound direct current and alternating current windings respectively. By varying the energization of the direct current, or saturating, winding the saturation of the magnetic circuit for the alternating current winding is varied thereby to vary the reactance of the alternating current winding. Heretofore, the variations in reactance of saturable reactors has been substantially continuous with variations in the energization of the direct current saturating winding. This is due to the relatively smooth curvature of the magnetization curve of the magnetic circuit of the reactors. There are, however, a number of applications where it is desirable to have the reactors exhibit a substantially constant reactance over a considerable range of direct current excitaton up to a certain definite point, after which the reactance will decrease with further increases in the energization of the direct current saturating winding. One such application is in the automatic control of grid controlled vapor electric valves. Such valves are often controlled by impedance networks or bridge circuits including as an element thereof a saturable core reactor, and it is often desirable to give the bridge circuit such characteristics that over a considerable range of operation, no change in grid potential is produced whereas beyond this range the grid potential is rapidly varied. Another application is in an automatic load division system, such as is illustrated in Patent No. 1,902,435, granted March 21, 1933 on an application of Weber H. Arkenburgh, and assigned to the assignee of the present application.

In accordance with my invention I provide a variable reactance device which has substantially constant reactance over a considerable range of operation up to a definite point, after which the reactance is variable in a substantially continuous manner. Preferably, I secure this result by providing a magnetic shunt for the magnetic circuit for the direct current winding of the device. This shunt acts to divert substantially all of the direct current produced flux from the magnetic circuit for the alternating current winding up to a point where saturation occurs in the shunt. After this point, the direct current saturating flux is substantially all diverted into the magnetic circuit for the alternating current winding, thereby producing saturation of this circuit and decreasing the reactance of the alternating current winding.

My invention will be better understood from the following description taken in connection with the accompanying drawing and its scope will be pointed out in the appended claims.

Figure 2:
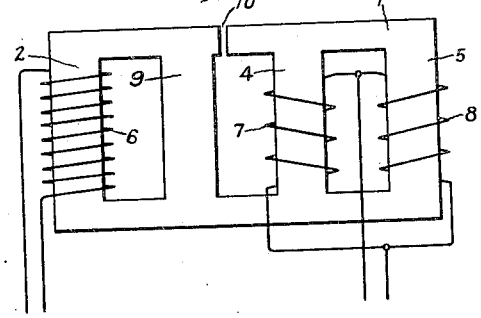
Figure 3:
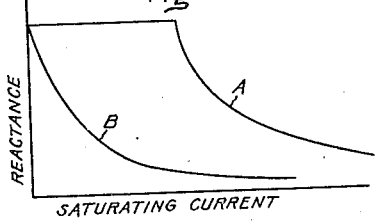

In the drawing, Fig. 1 illustrates diagrammatically an embodiment of my invention, Fig. 2 illustrates a modification thereof, and Fig. 3 is a set of curves illustrating the operating characteristics of the illustrated embodiments of my invention.

Referring now to Fig. 1 of the accompanying drawing wherein is illustrated diagrammatically, by way of example, one of a number of possible types of saturable core reactors to which my invention is applicable. The reactor consists of a four legged core member 1, whose four legs are designated by the characters 2, 3, 4 and 5, respectively. On leg 2 is wound a direct current saturating winding 6. On legs 4 and 5 are wound a pair of alternating current windings 7 and 8, respectively. These windings, which may either be connected in series, or in parallel as shown, are so arranged that the flux produced thereby circulates in legs 4 and 5 exclusively, and does not traverse either of the other legs. This is a well known arrangement for preventing an alternating current voltage from being induced in the direct current saturating winding.

Leg 3, which is in effect a magnetic shunt for the flux produced by the direct current saturating winding 6 is composed of a special ferroing winding 6 is composed of a special ferro-magnetic material having a relatively high permeability; a relatively sharp, definite saturation point; and a relatively flat and straight magnetization curve beyond saturation. One such material is a nickel-iron alloy known to the trade as Permalloy, which consists of substantially 78½% nickel and 21½% iron. This magnetic shunt, or leg, 3 may be inserted in the core member 1 in any manner desired. For example, if the core member is a laminated structure, the leg 3 may be made of thin sheets which are interleaved between the laminations of the core.

The operation of the arrangement illustrated in Fig. 1 is as follows: As the current through saturating winding 6 increases from zero the direct current flux produced thereby will substantially all pass through the magnetic shunt 3 due to its relatively high permeability. This continues up to the point of saturation of the shunt 3 after which its permeability, of course, decreases with the result that substantially all of the additional flux produced by increases in energization of the saturating winding 6 will traverse both legs 4 and 5, thereby decreasing the reactance of the windings 7 and 8 to alternating current. The result is that between zero excitation and a certain definite excitation of winding 6 the reactance of the alternating current windings 7 and 8 remains substantially constant, while, when the excitation exceeds the predetermined point at which leg 3 becomes saturated, the reactance of windings 7 and 8 will be continuously decreased.

This operating characteristic of the reactor illustrated in Fig. 1 is shown in Fig. 3 by the curve A, where reactance of the alternating current winding as ordinates is plotted against saturating current of the direct current winding 6 as abscissae. As will be seen, the curve A is substantially a horizontal line during its beginning, showing that the reactance remains high and substantially constant over a considerable range of saturating current, after which, and at a definite point, the reactance continuously decreases with increases in saturating current. Curve B illustrates the operating characteristic of an ordinary saturable core reactor.

It should be understood that while I have illustrated in Fig. 1 an application of my invention to a saturable core reactor, my invention is not limited to such an application and it obviously could also be applied to various other variable reactance devices which depend upon magnetic saturation, such for example, as transformers in which it is desired to vary the reactance, or saturation.

In the modification illustrated in Fig. 2 the magnetic shunt 3 of special material, which is illustrated in Fig. 1, is replaced by a magnetic shunt 9 of the same material as the rest of core 1. Also an air gap 10 is inserted in the core 1.

The operation of this modification is as follows: During the early part of the range of the energization of saturating winding 6, substantially all of the direct current flux will thread leg 9 because the magnetic circuit including this leg will have considerably lower reluctance than the other magnetic circuit including the legs 4 and 5, due to the presence of the air gap 10. However, as the energization of direct current saturating winding 6 is increased, leg 9 will eventually become magnetically saturated with the result that further increases in flux induced by winding 6 will be forced to traverse the air gap 10 and also the legs 4 and 5, thereby eventually saturating these legs with the result that the reactance of the alternating current windings 7 and 8 is decreased.

While I have shown and described particular embodiments of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. A variable reactance device having interlinked magnetic circuits for direct and alternating current windings respectively, and means operative in accordance with the energization of said direct current winding for substantially preventing direct current flux from circulating in the common portion of said magnetic circuits up to a predetermined energization of said direct current winding and thereafter permitting direct current flux to circulate in said common portion of said magnetic circuits.

2. A variable reactance device having interlinked magnetic circuits for direct and alternating current windings respectively, and a magnetic shunt for the magnetic circuit for the direct current winding, said magnetic shunt being arranged to saturate before the magnetic circuits become saturated.

3. A variable reactance device having, in combination, an alternating current winding, a magnetic circuit for the flux produced by said winding, a direct current saturating winding, and a pair of parallel magnetic circuits for the flux produced by said direct current winding, one of said parallel magnetic circuits including a part of said first mentioned magnetic circuit, the other parallel magnetic circuit being arranged to be the first one to become magnetically saturated with increases in current in said direct current winding.

4. A variable reactance device having a direct current winding and an alternating current winding, interlinking magnetic circuits for said windings respectively, and a magnetic shunt for the magnetic circuit for the direct current winding, said shunt having a relatively high permeability up to a relatively definite saturation point as compared with ordinary magnetic material.

5. A saturable reactor having a direct current winding and an alternating current winding, interlinking magnetic circuits for said windings respectively, and a magnetic shunt for the magnetic circuit for said direct current winding, said shunt consisting of substantially 78½% nickel and 21½% iron.

6. A variable reactance device having a direct current winding and an alternating current winding, interlinking magnetic circuits for the respective windings, an air gap in the magnetic circuit for the direct current winding, and a magnetic shunt for the magnetic circuit of said direct current winding, said shunt producing a magnetic circuit which includes said direct current winding and excludes said air gap.

AUGUST SCHMIDT, Jr.